US012508396B1

(12) United States Patent
Qiu (10) Patent No.: US 12,508,396 B1
(45) Date of Patent: Dec. 30, 2025

(54) AROMATHERAPY CANDLE LAMP (71) Applicant: Ruixin Qiu, Shenzhen (CN)

(72) Inventor: Ruixin Qiu, Shenzhen (CN)

( * ) Notice: Subject to any disclaimer, the term of this patent is extended or adjusted under 35 U.S.C. 154(b) by 0 days.

(21) Appl. No.: 19/231,730

(22) Filed: Jun. 9, 2025

(30) Foreign Application Priority Data

Dec. 31, 2024 (CN) .......................... 202423317505.9

(51) Int. Cl.
| | | |
|---|---|---|
| *A61M 21/02* | (2006.01) | |
| *A61M 21/00* | (2006.01) | |
| *F21S 10/04* | (2006.01) | |
| *H05B 1/02* | (2006.01) | |

(52) U.S. Cl.
CPC ............. *A61M 21/02* (2013.01); *F21S 10/04* (2013.01); *H05B 1/025* (2013.01); *A61M 2021/0016* (2013.01); *A61M 2021/0066* (2013.01); *A61M 2205/3368* (2013.01); *A61M 2205/364* (2013.01); *A61M 2205/583* (2013.01); *A61M 2205/587* (2013.01); *A61M 2205/59* (2013.01); *A61M 2205/8237* (2013.01)

(58) Field of Classification Search
CPC .......... A61M 21/02; A61M 2021/0016; A61M 2021/0066; A61M 2205/3368; A61M 2205/364; A61M 2205/583; A61M 2205/587; A61M 2205/59; A61M 2205/8237; F21S 10/04; H05B 1/025
USPC ....................................................... 600/26–28
See application file for complete search history.

(56) References Cited

U.S. PATENT DOCUMENTS

| | | | |
|---|---|---|---|
| 7,133,605 B2 * | 11/2006 | Niemeyer ............... | F27D 19/00 |
| | | | 392/390 |
| 9,585,980 B1 * | 3/2017 | Li .......................... | A61L 9/032 |
| 10,251,967 B1 * | 4/2019 | Wang ...................... | F21S 8/035 |
| 12,253,254 B1 * | 3/2025 | Yi .......................... | F21V 35/003 |
| 2004/0068781 A1 * | 4/2004 | Hill ........................ | A61L 9/12 |
| | | | 4/222 |
| 2005/0030747 A1 * | 2/2005 | Bogdal .................... | A61L 9/03 |
| | | | 362/253 |

(Continued)

OTHER PUBLICATIONS

English Translation of CN 222030091 U to Lin, Jian-Hua (see attached), Effective Filing Date of Mar. 11, 2024, publication date of Nov. 19, 2024 (Year: 2024).*

*Primary Examiner* — Sunita Reddy
(74) *Attorney, Agent, or Firm* — JEEN IP LAW, LLC (57) ABSTRACT

An aromatherapy candle lamp is provided, which includes a housing and a bottle body that are detachably connected, the housing is provided with an installation cavity. The installation cavity is provided with a control module. The housing is provided with a plurality of volatilization holes. The bottle body is provided with a containment chamber, which is communicated to each volatilization hole. The containment chamber is configured to accommodate an aromatherapy substance, and a heating module is provided in the containment chamber. The heating module is electrically connected to the control module. When the aromatherapy substance is placed in the containment chamber, the heating module contacts the aromatherapy substance. When the aromatherapy candle lamp needs to be used, the control module turns on the heating module, a surface temperature of the heating module increases, thereby increasing a temperature of the aromatherapy substances around the heating module.

8 Claims, 11 Drawing Sheets

(56) References Cited

U.S. PATENT DOCUMENTS

| | | | |
|---|---|---|---|
| 2005/0147523 A1* | 7/2005 | Laudamiel-Pellet | A01M 1/2038 422/123 |
| 2005/0239009 A1* | 10/2005 | Holmburg | C11C 5/008 431/253 |
| 2006/0196100 A1* | 9/2006 | Laudamiel-Pellet | A61L 9/125 43/1 |
| 2008/0036332 A1* | 2/2008 | Helf | A61L 9/14 310/311 |
| 2009/0109663 A1* | 4/2009 | Tsai | A61L 9/122 362/190 |
| 2011/0127914 A1* | 6/2011 | Patton | F21K 9/23 362/249.06 |
| 2012/0082947 A1* | 4/2012 | Crapser | A61J 9/00 431/292 |
| 2013/0265743 A1* | 10/2013 | Lee | A61L 9/044 362/640 |
| 2014/0016329 A1* | 1/2014 | Bonadonna | F21V 15/01 362/362 |
| 2014/0140042 A1* | 5/2014 | Schreiber | A61L 9/037 362/96 |
| 2014/0193764 A1* | 7/2014 | Pizzini | A61M 11/041 432/247 |
| 2016/0144150 A1* | 5/2016 | Berg | A61B 5/486 600/28 |
| 2016/0298816 A1* | 10/2016 | Fang | F21K 2/00 |
| 2017/0067608 A1* | 3/2017 | Patton | F21V 33/0004 |
| 2018/0177907 A1* | 6/2018 | Li | F21S 6/001 |
| 2019/0041012 A1* | 2/2019 | Fang | F21S 10/005 |
| 2019/0195447 A1* | 6/2019 | Wu | B05B 1/14 |
| 2020/0114038 A1* | 4/2020 | Yuan | F21S 10/046 |
| 2020/0121819 A1* | 4/2020 | Lee | F21V 1/10 |
| 2021/0060200 A1* | 3/2021 | Shin | A61L 9/122 |
| 2021/0178003 A1* | 6/2021 | Li | F21S 10/046 |
| 2021/0247042 A1* | 8/2021 | Wu | F21S 6/001 |
| 2021/0290812 A1* | 9/2021 | Yu | B05B 17/0676 |
| 2023/0149659 A1* | 5/2023 | Xu | A61M 21/02 600/27 |
| 2024/0173450 A1* | 5/2024 | Gong | A61L 9/03 |
| 2024/0350695 A1* | 10/2024 | Ma | A61L 9/122 |
| 2025/0057143 A1* | 2/2025 | Lyu | A61L 9/122 |

* cited by examiner

AROMATHERAPY CANDLE LAMP

CROSS-REFERENCE TO RELATED APPLICATIONS

This application claims priority to Chinese Patent Application No. 202423317505.9, filed on Dec. 31, 2024, which is hereby incorporated by reference in its entirety.

TECHNICAL FIELD

The present disclosure relates to the field of candle lamp technologies, and in particular, to an aromatherapy candle lamp.

BACKGROUND

Traditional aromatherapy candles place or melt aromatherapy substances inside a candle body, which will evaporate outward through the candle structure to change the environmental atmosphere. However, the aromatherapy substances inside these candles are prone to evaporate through the candle's body, rendering it difficult to store them for a long time or directly in exposed environments. Moreover, the fragrance of the aromatherapy substances in these candles is fixed, and if different fragrances are needed, the entire aromatherapy candle must be replaced. At the same time, the volatilization range and speed of the aromatherapy substances inside these candles are limited during use, and the fragrance of a single aromatherapy candle can only be distributed in a very small range. Besides that, due to the use of open flames, this type of aromatherapy candle is prone to fire and safety accidents.

The existing electronic aromatherapy candles generally use aromatherapy substances added to the electronic candle lamp to make it to be an aromatherapy candle lamp, and then the aromatherapy substances are naturally evaporated to simulate the effect of traditional aromatherapy candles.

Regarding the relevant technologies mentioned above, they simply add aromatherapy substances into the electronic candle lamp to make it to be an aromatherapy candle lamp. The volatilization rate of aromatherapy substances is relatively slow, resulting in low fragrance in the environment and limited impact on the environment.

SUMMARY

In order to improve the evaporation rate of aromatherapy substances inside the aromatherapy candle lamp, the present disclosure provides an aromatherapy candle lamp.

The aromatherapy candle lamp provided in the present disclosure adopts the following technical solution.

An aromatherapy candle lamp, including a housing and a bottle body, the housing and the bottle body are detachably connected, the housing is provided with an installation cavity, and the installation cavity is provided with a control module, the control module is configured to control electronic components of the aromatherapy candle; the housing is provided with a plurality of volatilization holes that penetrate through the housing;

the bottle body is provided with a containment chamber, and the containment chamber is communicated to each of the volatilization holes; the containment chamber is configured to accommodate an aromatherapy substance; the containment chamber is provided with a heating module, and the heating module is electrically connected to the control module; when the aromatherapy substance is placed in the containment chamber, the heating module contacts the aromatherapy substance.

By adopting the above technical solution, when the aromatherapy candle lamp needs to be used, the control module will turn on the heating module, causing the surface temperature of the heating module to rise, thereby increasing the temperature of the aromatherapy substance around the heating module and accelerating a diffusion speed of the aromatherapy substance. This improves the problem of simply adding aromatherapy substance into an electronic candle lamp, rendering it to be an aromatherapy candle lamp. The volatilization speed of the aromatherapy substance is relatively slow, resulting in low fragrance in the environment and limited impact on the environment.

In some embodiments of the present disclosure, one or more connection lines are provided between the control module and the heating module, one end of the connection lines is electrically connected to the control module, and the other end of the connection lines is electrically connected to the heating module, and the connection lines have flexibility.

By adopting the above technical solution, when the aromatherapy substance is placed in the containment chamber, the heating module is placed on a top of the aromatherapy substance, and the connection lines are arranged to accelerate the heating of the heating module. As the aromatherapy substance continues to evaporate, the heating module moves away from the control module along with the aromatherapy substance. The connection lines always maintain an electrical connection between the heating module and the control module until the aromatherapy substance contained in the containment chamber is basically heated and evaporated, thereby reducing the residual volatilization of the aromatherapy substance in the containment chamber. At the same time, the heating module moves along with a surface of the aromatherapy substance, making the volatilization speed of the aromatherapy substance more stable and improving usability.

In some embodiments of the present disclosure, an outer side of the heating module is wrapped with a protective cover.

By adopting the above technical solution and setting the protective cover, the heating module is less likely to come into direct contact with the aromatherapy substance, thereby making it less likely for the heating module to excessively heat and raise the temperature of the aromatherapy substance, resulting in more stable heating of the aromatherapy substance. At the same time, it also avoids direct contact between the aromatherapy substance and the heating module, making the heating module less susceptible to erosion by the aromatherapy substance, thereby improving the service life and usability of the heating module.

In some embodiments of the present disclosure, the heating module is provided with a temperature sensor, the temperature sensor is electrically connected to the control module, and the temperature sensor is configured to sense a temperature of the heating module.

In some embodiments of the present disclosure, the housing is provided with a switch hole that is penetrated through, and a control switch is provided inside the switch hole; the control switch abuts against a switch of the control module, the control switch is configured to control opening or closing of the heating module and to control a heating temperature of the heating module.

In some embodiments of the present disclosure, the control module is fixed and electrically connected with a plurality of display lamps, the display lamps are distributed around an axis of the control switch, a distance between adjacent two display lamps is the same; each display lamp is configured to display a gear of the heating module.

In some embodiments of the present disclosure, the housing is provided with a charging hole that is penetrated through, the control module is fixed and electrically connected to a charging module, the charging module is penetrated and clamped to the charging hole, the control module is fixed and electrically connected to a charging display light, and the charging display light is configured to display a charging state of the charging module.

In some embodiments of the present disclosure, the housing is provided with a combustion hole that penetrates through, and a combustion block is provided in the combustion hole to simulate a combustion state of a flame; the installation cavity is provided with a flame module, and the flame module is electrically connected to the control module; the flame module is fixed and electrically connected to a flame display lamp, and when the flame display lamp is turned on, it cooperates with the combustion block to achieve a simulation of flame combustion.

In some embodiments of the present disclosure, a swing spring is provided between the combustion block and the flame module, one end of the swing spring is fixedly connected to the combustion block, and the other end of the swing spring is fixedly connected to the flame module; when external force drives the combustion block, the swing spring drives the combustion block to swing and to achieve a simulation of flame combustion with the combustion block.

In summary, the present disclosure includes at least one beneficial technical effect as follows.

1. When the aromatherapy candle lamp needs to be used, the control module will turn on the heating module, causing the surface temperature of the heating module to rise, thereby increasing the temperature of the aromatherapy substance around the heating module and accelerating a diffusion speed of the aromatherapy substance. This improves the problem of simply adding aromatherapy substance into an electronic candle lamp, rendering it to be an aromatherapy candle lamp. The volatilization speed of the aromatherapy substance is relatively slow, resulting in low fragrance in the environment and limited impact on the environment.

2. When the aromatherapy substance is placed in the containment chamber, the heating module is placed on the top of the aromatherapy substance, and the connection lines are arranged to accelerate the heating of the heating module. As the aromatherapy substance continues to evaporate, the heating module moves away from the control module along with the aromatherapy substance. The connection lines always maintain an electrical connection between the heating module and the control module until the aromatherapy substance contained in the containment chamber is basically heated and evaporated, thereby reducing the residual volatilization of the aromatherapy substance in the containment chamber. At the same time, the heating module moves along with a surface of the aromatherapy substance, making the volatilization speed of the aromatherapy substance more stable and improving usability.

3. The setting of the protective cover makes it difficult for the heating module to come into direct contact with the aromatherapy substance, thereby preventing the heating module from overheating the aromatherapy substance, making the heating of the aromatherapy substance more stable, and also avoiding direct contact between the aromatherapy substance and the heating module, making the heating module less susceptible to erosion by the aromatherapy substance, thus improving the service life and usability of the heating module.

Numeral reference: 1—housing; 11—lower housing part; 111—connection ring; 112—charging hole; 12—upper housing part; 121—connection slot; 122—switch hole; 1221—control switch; 13—candlestick body; 131—flame module; 1311—flame display lamp; 132—combustion hole; 1321—combustion block; 133—swing spring; 14—installation cavity; 141—first cavity section; 142—second cavity section; 15—control module; 151—heating display lamp; 152—charging module; 153—charging display light; 154—power module; 16—volatilization tank; 161—volatilization hole; 2—bottle body; 21—containment chamber; 211—heating module; 2111—temperature sensor; 2112—protective cover; 212—connection line; 151*a*—gear.

DESCRIPTION OF EMBODIMENTS

Further detailed explanation of the present disclosure will be provided in combination with FIGS. 1-11.

Figure 1:
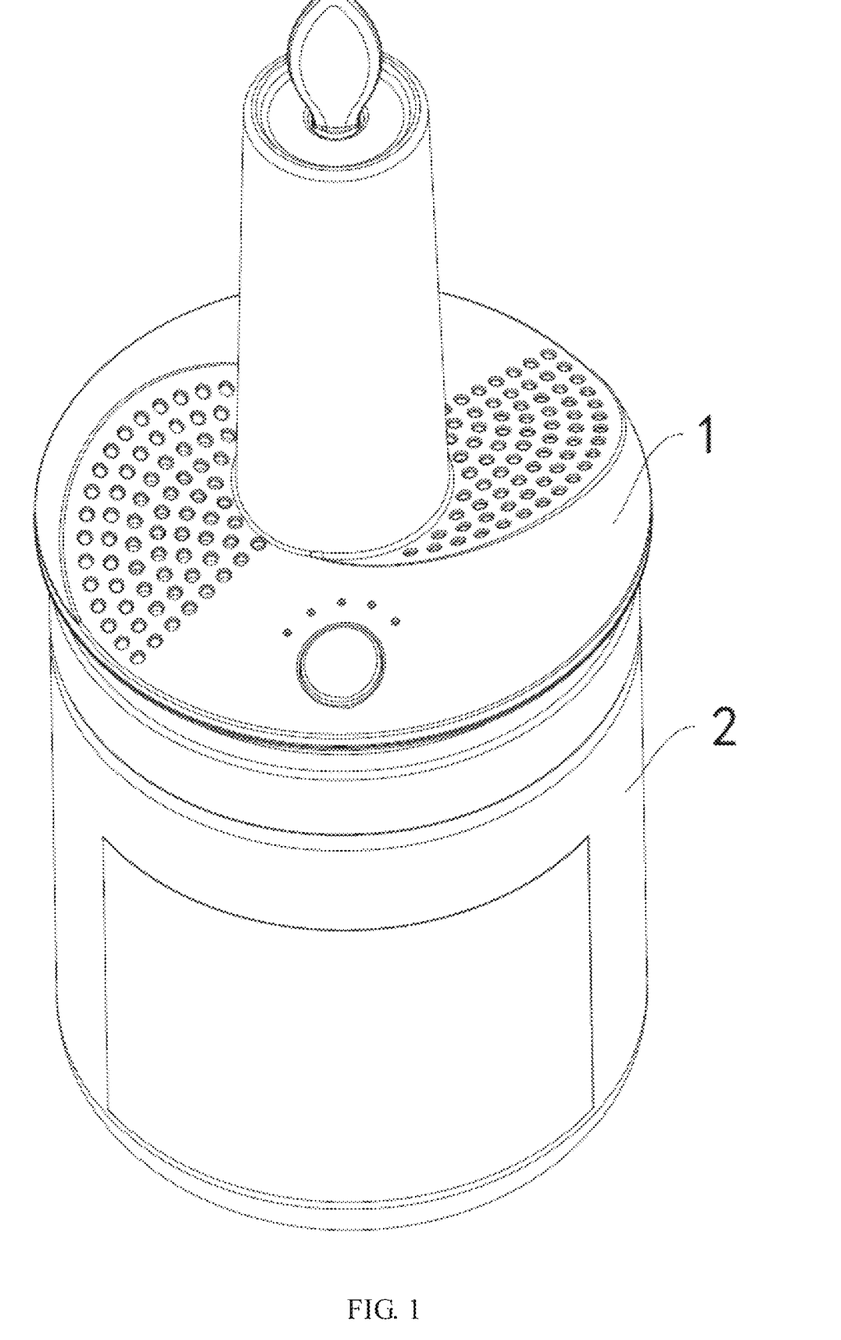
FIG. 1 is a schematic diagram of an overall structure of an embodiment of the present disclosure.
Figure 2:
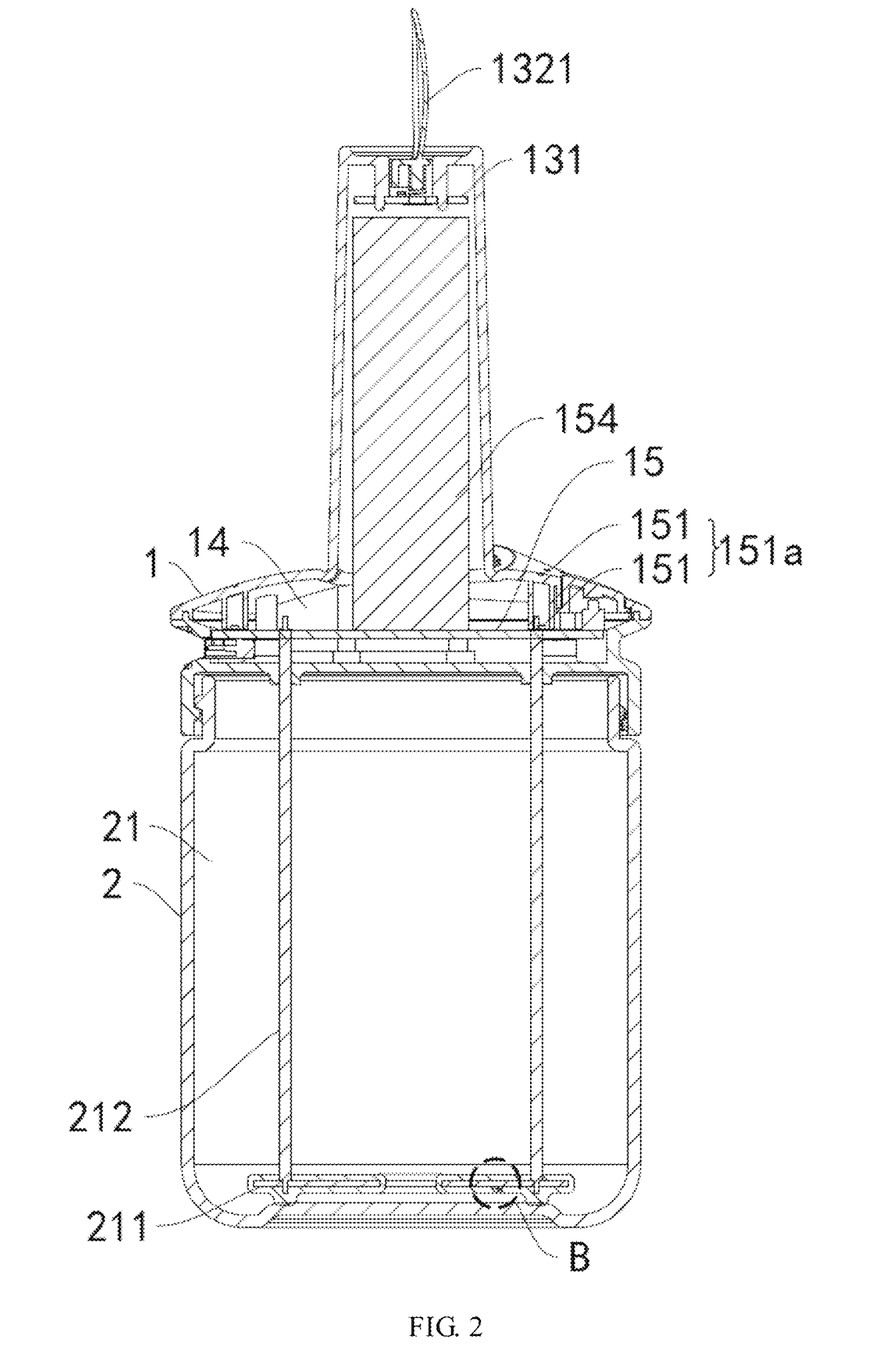
FIG. 2 is a sectional view of an overall structure of an embodiment of the present disclosure.

An embodiment of the present disclosure discloses an aromatherapy candle lamp. Referring to FIGS. 1 and 2, the aromatherapy candle lamp includes a housing 1 and a bottle body 2.

Figure 3:
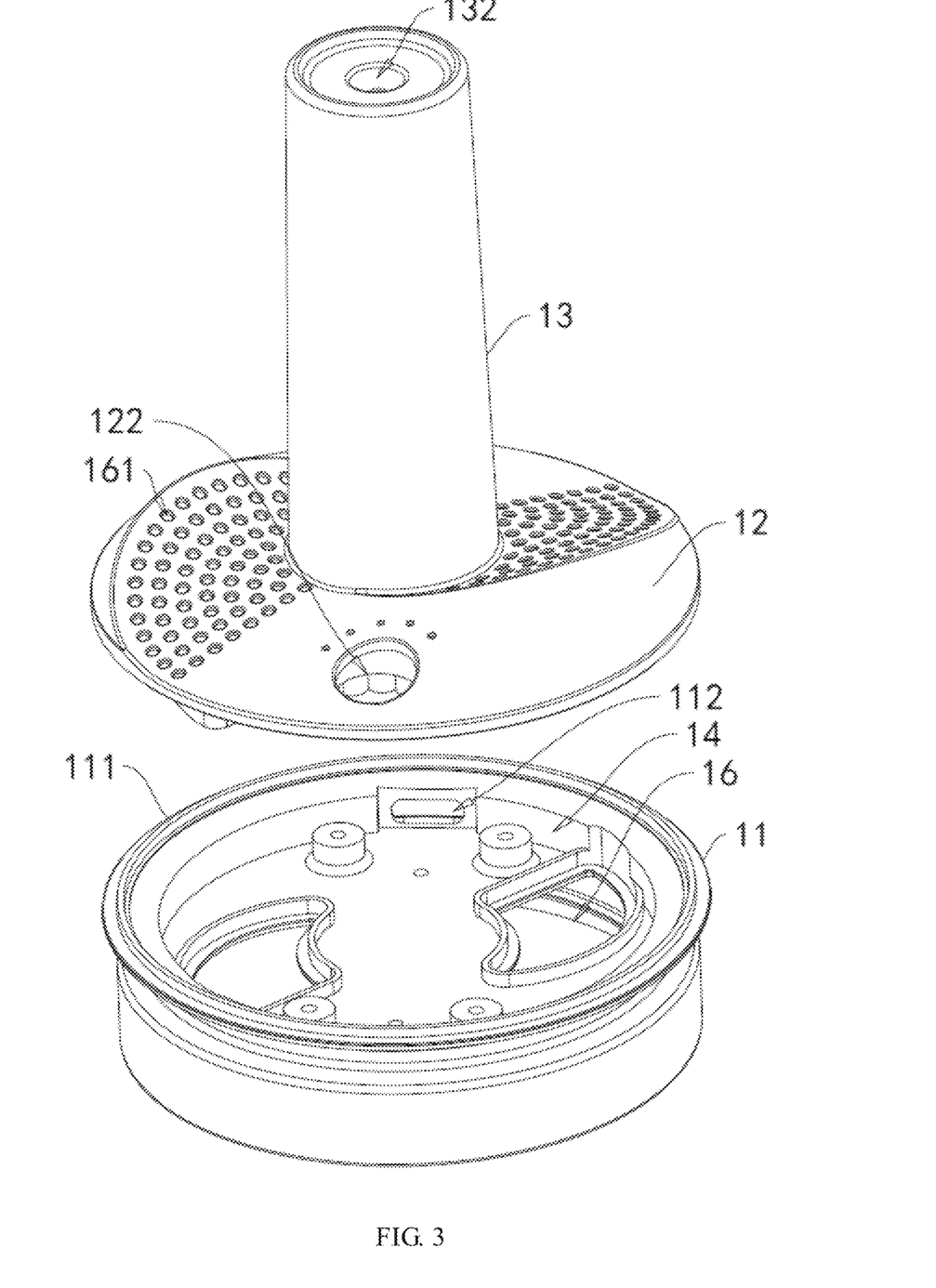
FIG. 3 is an exploded view of a housing in an embodiment of the present disclosure.
Figure 4:
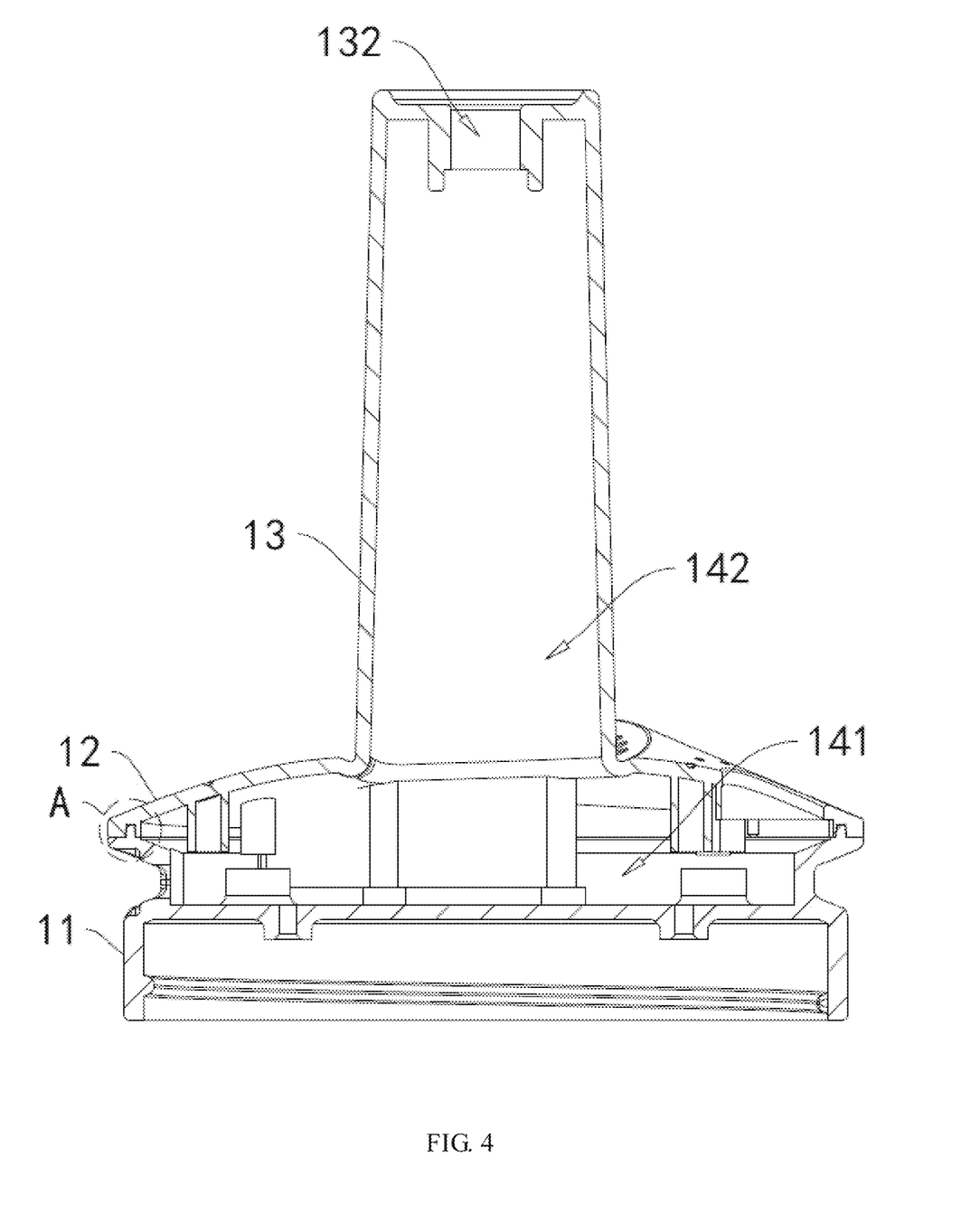
FIG. 4 is a sectional view of the housing of an embodiment of the present disclosure.
Figure 5:
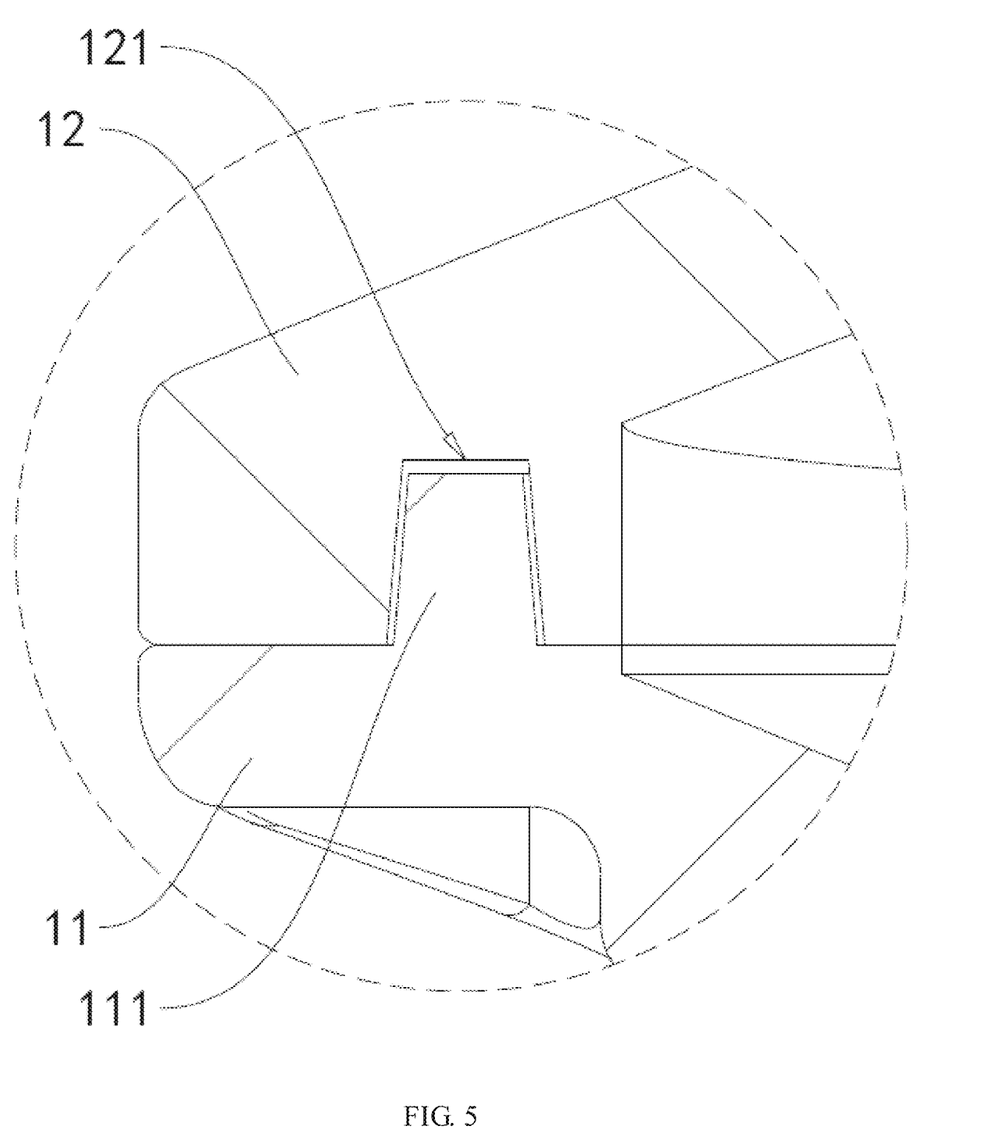
FIG. 5 is an enlarged view of part A of FIG. 4.

Referring to FIGS. 3, 4, and 5, the housing 1 includes a lower housing part 11, an upper housing part 12, and a candlestick body 13. The upper housing part 12 and the lower housing part 11 are fixedly connected by screws, the lower housing part 11 is located at a top of the upper housing part 12. The candlestick body 13 is fixedly connected to the upper housing part 12 and located in a middle of the top of the upper housing part 12. A connection ring 111 is fixedly connected to one side of the lower housing part 11 near the upper housing part 12, and a connection slot 121 is provided on one side of the upper housing part 12 near the lower housing part 11. When the upper housing part 12 is connected to the lower housing part 11, the connection ring 111 is inserted and clamped into the connection slot 121, thereby ensuring a sealing of a connection between the upper housing part 12 and the lower housing part 11.

Referring to FIG. 4, an interior of housing 1 is provided with an installation cavity 14, and the installation cavity 14 includes a first cavity section 141 and a second cavity section 142. The first cavity section 141 is communicated to the second cavity section 142, the first cavity section 141 is located between the upper housing part 12 and the lower housing part 11, and the second chamber portion is located in a middle position of the candlestick body 13.

Figure 6:
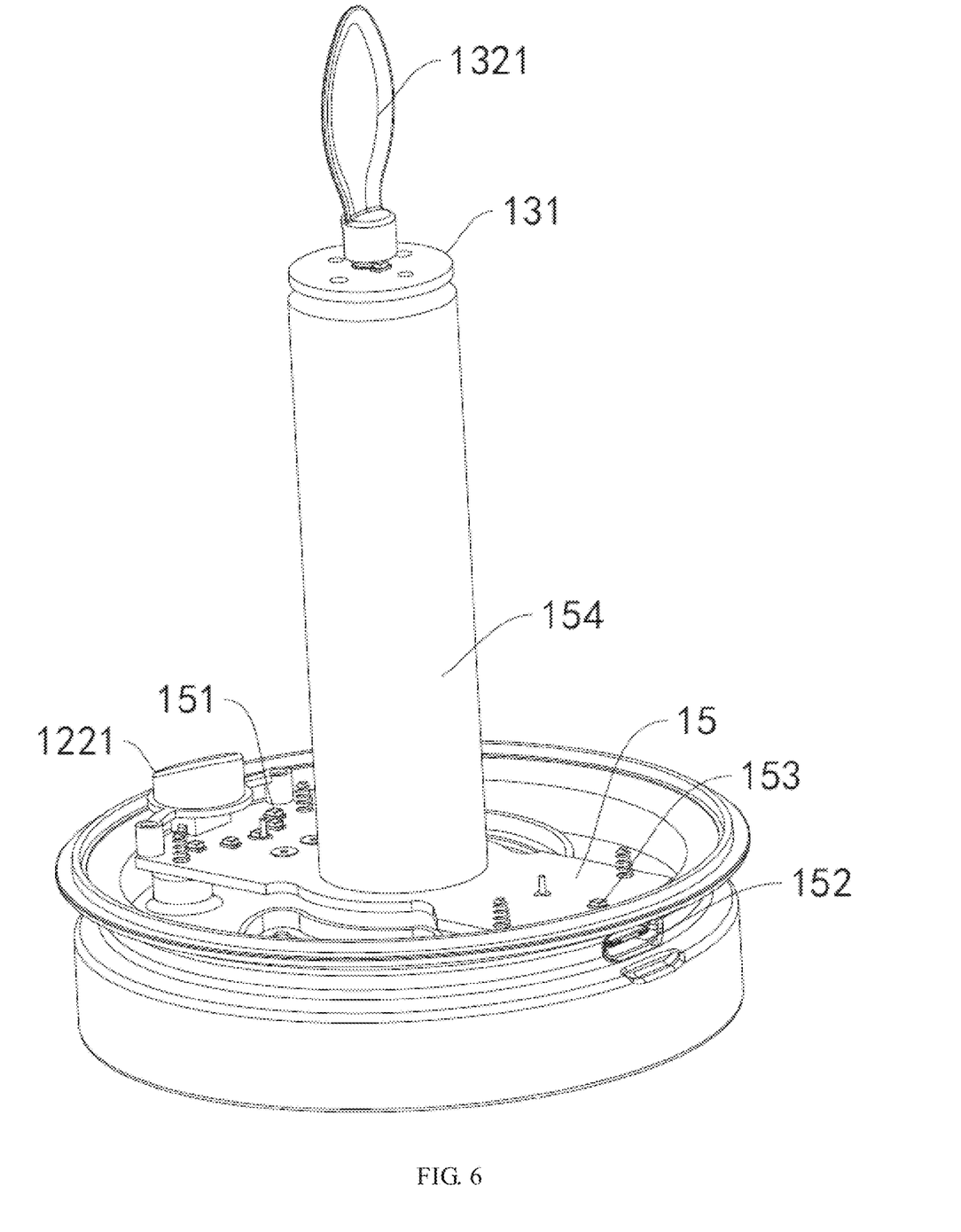
FIG. 6 is a schematic structural diagram of a control module in an embodiment of the present disclosure.

Referring to FIG. 3 and FIG. 6, a control module 15 is provided and fixed in the installation cavity 14. The control module 15 is configured to control electronic components of the aromatherapy candle. The upper housing part 12 is provided with a switch hole 122 that is penetrated through. The switch hole 122 is communicated to the installation slot, and a control switch 1221 is slid and matched inside the switch hole 122. A bottom of the control switch 1221 abuts against a switch of the control module 15.

Referring to FIG. 6, the control module 15 is fixed and electrically connected with a plurality of display lamps 151. The display lamps 151 are distributed around an axis of the control switch 1221, and a distance between adjacent two display lamps 151 is the same. The display lamps 151 are configured to display a gear 151a of the heating module 211

Referring to FIGS. 3 and 6, an outer surface of the lower housing part 11 is provided with a charging hole 112 that penetrates through it. The control module 15 is fixed and electrically connected to a charging module 152, and the charging module 152 is inserted and clamped into the charging hole 112. The control module 15 is fixed and electrically connected to a charging display light 153, and the charging display light 153 is configured to display a charging state of the charging module 152.

Referring to FIGS. 3 and 6, the control module 15 is fixed and electrically connected to a power module 154. The power module 154 is configured to store and provide electrical energy for the control module 15. One end of the power module 154 away from the control module 15 is inserted into the second cavity section 142.

Figure 7:
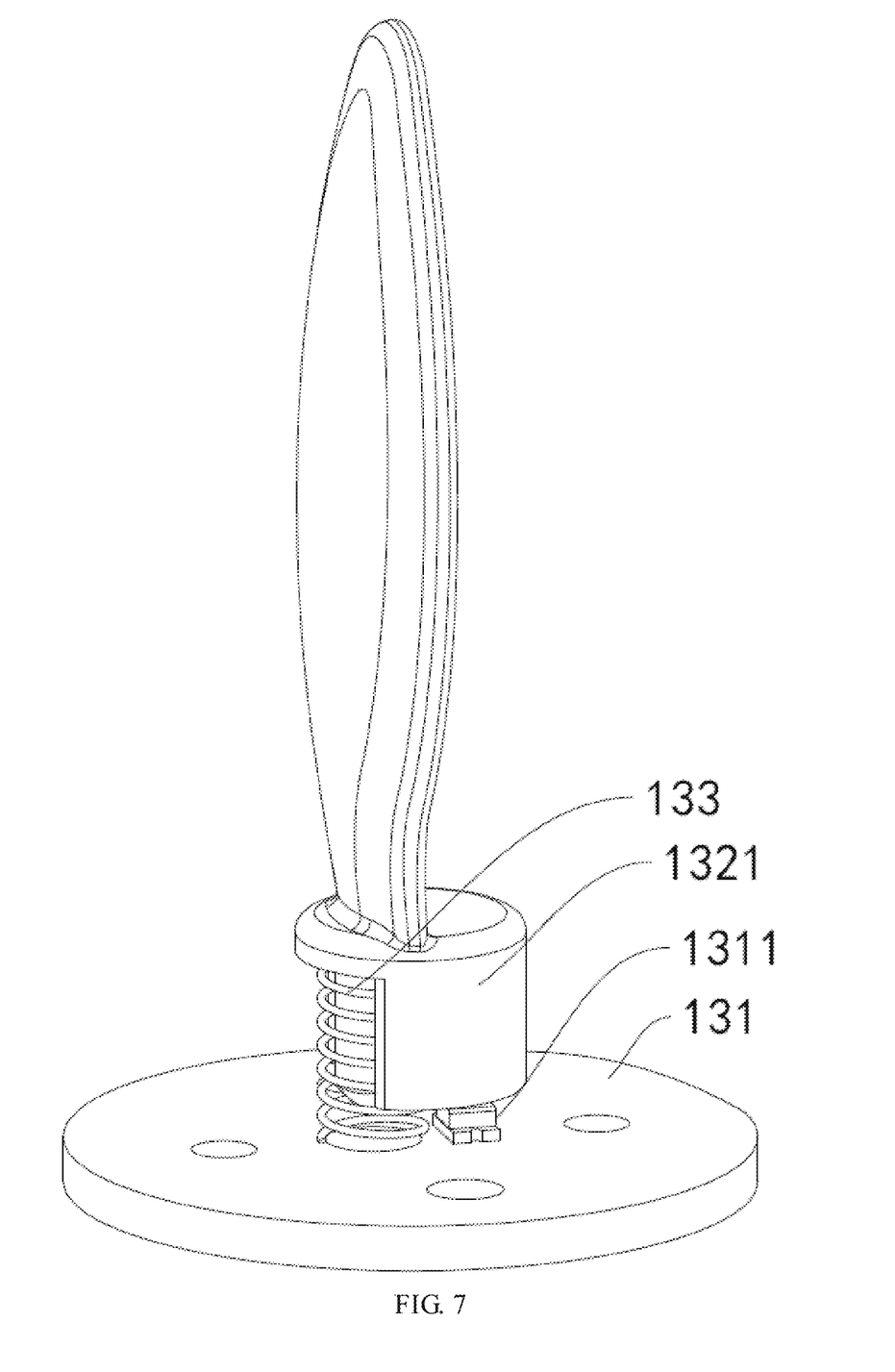
FIG. 7 is a schematic structural diagram of a flame module according to an embodiment of the present disclosure.

Referring to FIGS. 3 and 7, the second cavity section 142 is provided with a flame module 131, and the flame module 131 is located at a top of the power module 154 and is electrically connected to the control module 15. A top of the candlestick body 13 is provided with a combustion hole 132 that runs through it. The combustion hole 132 is communicated to the second cavity section 142, and a combustion block 1321 for simulating a combustion state of the flame is provided in the combustion hole 132. The flame module 131 is fixed and electrically connected to a flame display lamp 1311, and the flame display lamp 1311 is located at a bottom of the combustion block 1321. When the flame display lamp 1311 is turned on, it cooperates with the combustion block 1321 to achieve a better simulation of flame combustion. A swing spring 133 is provided between the combustion block 1321 and the flame module 131, and one end of the swing spring 133 is fixedly connected to the combustion block 1321, and the other end of the swing spring 133 is fixedly connected to the flame module 131. When external force drives the combustion block 1321, the swing spring 133 drives the combustion block 1321 to swing, thereby further enhancing the effect of simulating the flame combustion state of the combustion block 1321.

Figure 8:
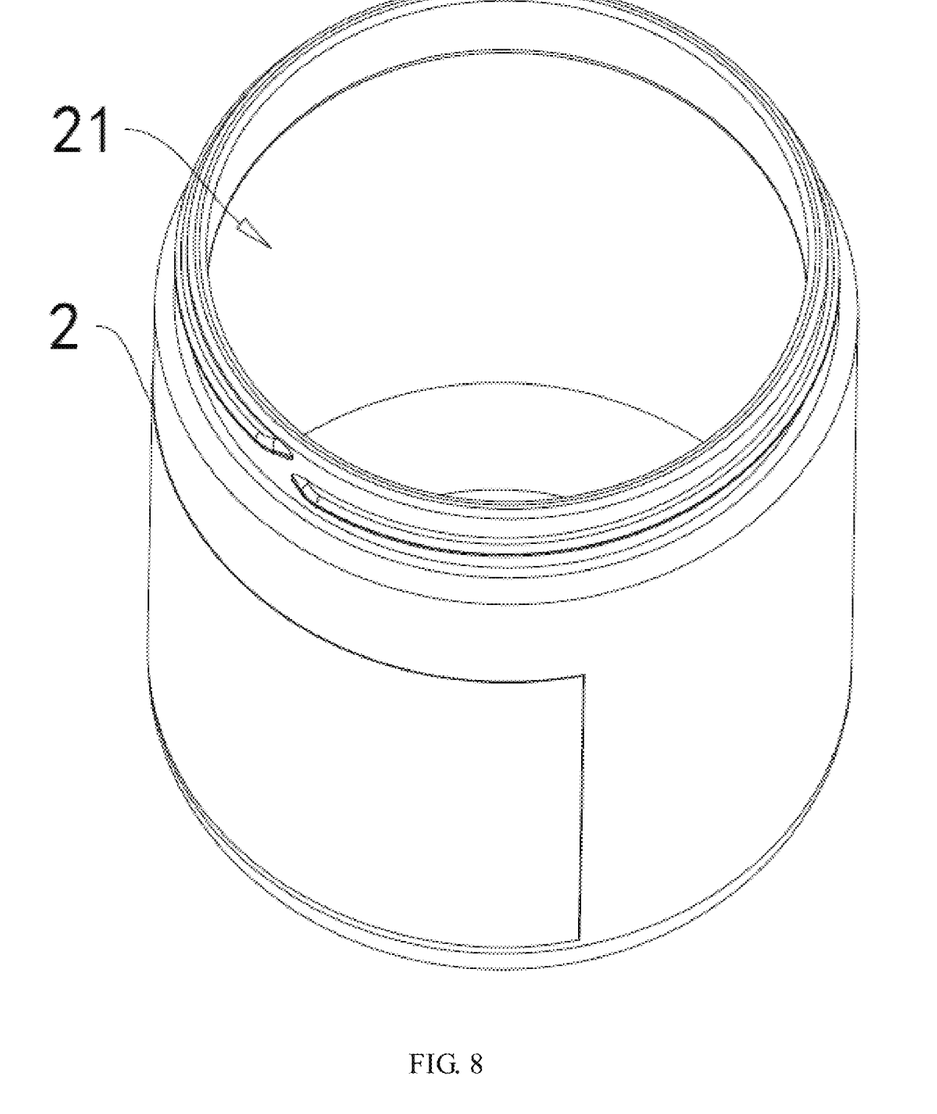
FIG. 8 is a schematic structural diagram of a bottle body in an embodiment of the present disclosure.

Referring to FIG. 8, the bottle body 2 is provided with a containment chamber 21 for accommodating the aromatherapy substances. A bottom of the lower housing part 11 is threaded connected to a top of the bottle body 2, thereby achieving quick disassembly and installation between the housing 1 and the bottle body 2, facilitating the addition of aromatherapy.

Referring to FIGS. 3 and 8, there are two volatilization tanks 16 on one side of the lower housing part 11, which are evenly distributed around an axis of the lower housing part 11. The two volatilization tanks 16 are communicated to the containment chamber 21, but not to the installation cavity 14, rendering it difficult for the aromatherapy substance in the containment chamber 21 to enter the installation cavity 14 through the volatilization tanks 16. The upper housing part 12 is provided with a plurality of volatilization holes 161 that run through it, and each volatilization hole 161 is communicated to the two volatilization tanks 16, so that the aromatherapy substance evaporates and diffuses from each volatilization hole 161.

Figure 9:
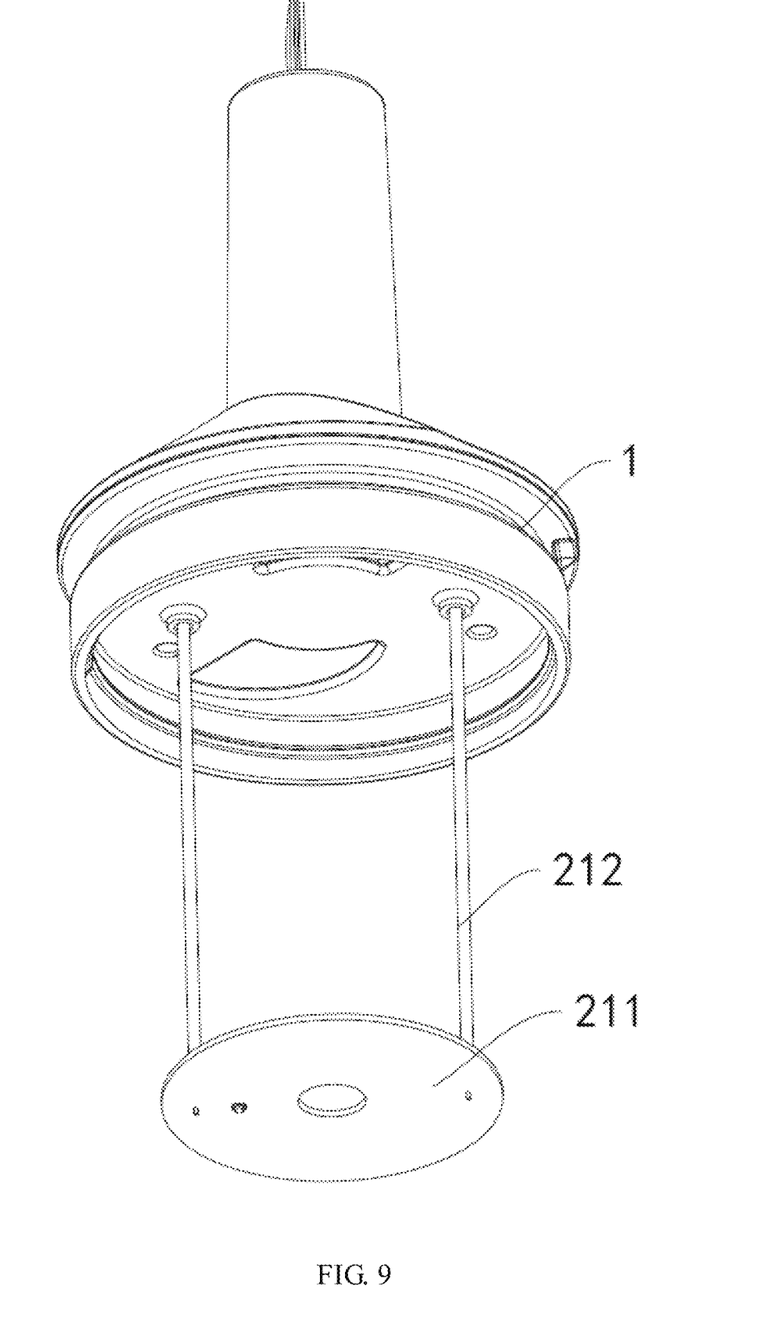
FIG. 9 is a schematic structural diagram of a heating module in an embodiment of the present disclosure.

Referring to FIG. 9, the containment chamber 21 is provided with a heating module 211, and two connection lines 212 are provided between the control module 15 and the heating module 211. One end of the connection lines 212 is electrically connected to the control module 15, and the other end of the connection lines 212 is electrically connected to the heating module 211, so that the heating module 211 is electrically connected to the control module 15. In this embodiment of the present disclosure, the connection line 212 has flexibility.

Thus, when the housing 1 and the bottle body 2 are detached from each other, the heating module 211 follows the two connection lines 212 to detach from the containment groove, thereby completing a placement of the aromatherapy substance in the containment chamber 21. When the housing 1 and the bottle body 2 are reconnected, the heating module 211 is located at the top of the aromatherapy substance, and the flexibility of the connection lines 212 accelerates the evaporation of the aromatherapy substance. As the aromatherapy substance continues to evaporate, the heating module 211 moves away from the control module 15 along with the aromatherapy substance, and the connection lines 212 always maintain an electrical connection between the heating module 211 and the control module 15 until the aromatherapy substance accommodated in the containment chamber 21 is basically heated and evaporated, thereby reducing the residual volatilization of the aromatherapy substance in the containment chamber 21. At the same time, the heating module 211 moves along with a material surface of the aromatherapy substance. Thus, the volatilization rate of the aromatherapy substances is more stable.

Figure 10:
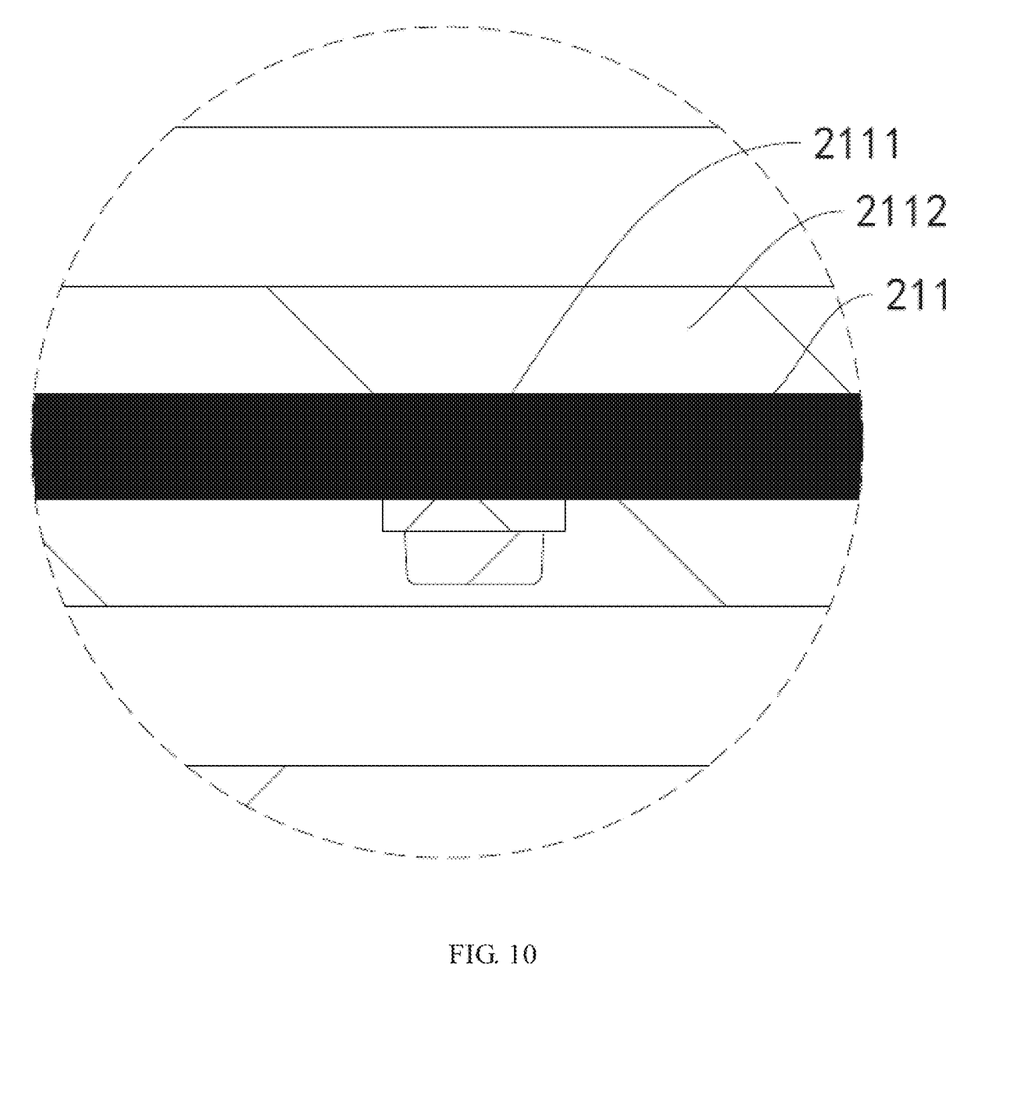
FIG. 10 is an enlarged view of part B of FIG. 2.

Referring to FIG. 10, the heating module 211 is provided with a temperature sensor 2111, and the temperature sensor 2111 is electrically connected to the control module 15. The temperature sensor 2111 is configured to sense a temperature of the heating module 211.

Figure 11:
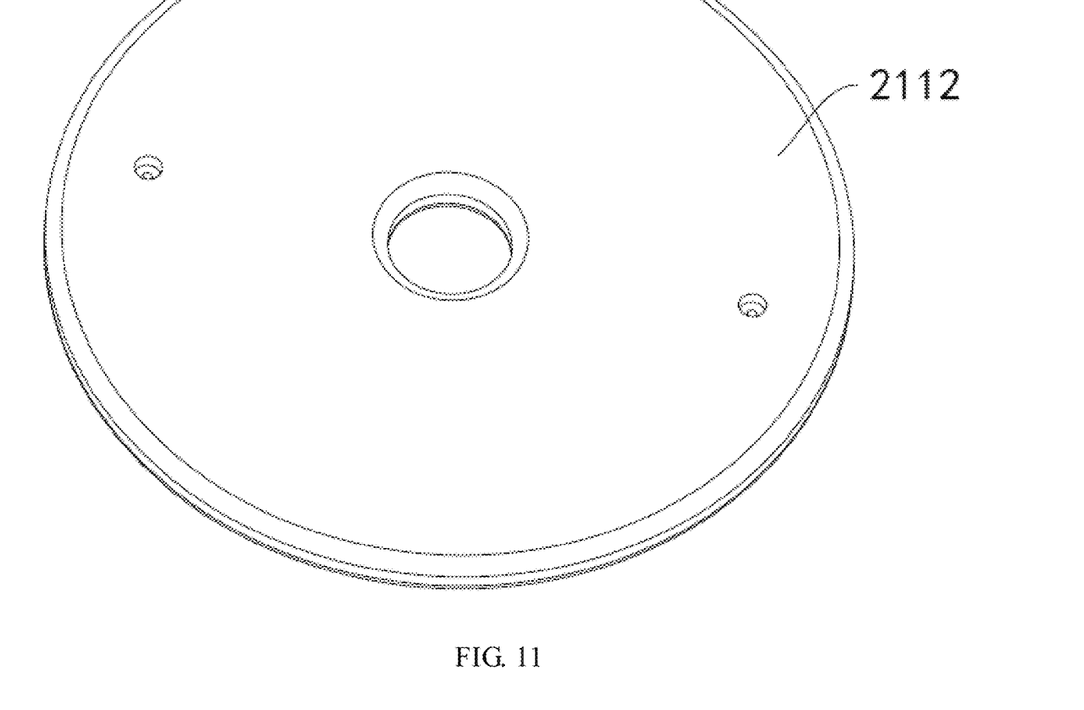
FIG. 11 is a schematic structural diagram of a protective cover according to an embodiment of the present disclosure.

Referring to FIGS. 10 and 11, an outer side of the heating module 211 is wrapped with a protective cover 2112. The protective cover 2112 simultaneously wraps the heating module 211 and the temperature sensor 2111. In this embodiment of the present disclosure, the material of the protective cover 2112 is selected as silicone, which makes it difficult for the heating module 211 to directly contact the aromatherapy substance, thereby preventing the heating module 211 from overheating the aromatherapy substance and rendering it more stable to heat. At the same time, it also avoids direct contact between the aromatherapy substance and the heating module 211, rendering the heating module 211 less susceptible to erosion by the aromatherapy substance, thereby improving the service life of the heating module 211.

The implementation principle of the aromatherapy candle lamp in the present disclosure is as follows: when the aromatherapy candle lamp needs to be used, the control module 15 turns on the heating module 211, causing the surface temperature of the heating module 211 to rise, thereby increasing the temperature of the aromatherapy substance around the heating module 211, accelerating the diffusion speed of the aromatherapy substance, and allowing more aromatherapy substance to float out from the volatilization holes 161. This improves the problem of simply adding aromatherapy substance into an electronic candle lamp, rendering it to be an aromatherapy candle lamp. The volatilization speed of the aromatherapy substance is relatively slow, resulting in a low fragrance in the environment and limited impact on the environment.

The above are the preferred embodiments of the present disclosure and do not limit the protection scope of the present disclosure. Therefore, any equivalent changes made according to the structure, shape, and principle of the present disclosure should be included in the scope.

What is claimed is:

1. An aromatherapy candle lamp, comprising:
  a housing and a bottle body,
  the housing and the bottle body are detachably connected,
  the housing is provided with an installation cavity, and the installation cavity is provided with a control module, the control module is configured to control electronic components of an aromatherapy candle;
  the housing is provided with a plurality of volatilization holes that penetrate through the housing;
  the bottle body is provided with a containment chamber, and the containment chamber is communicated to each of the volatilization holes;
  the containment chamber is configured to accommodate an aromatherapy substance;
  the containment chamber is provided with a heating module, and the heating module is electrically connected to the control module;
  while the aromatherapy substance is placed in the containment chamber, the heating module is located on top of the aromatherapy substance in contact with the aromatherapy substance in a manner that the heating module moves along with a material surface of the aromatherapy substance;
  wherein one or more connection lines are provided between the control module and the heating module, one end of the connection lines is electrically connected to the control module, and the other end of the connection lines is electrically connected to the heating module, and the connection lines have flexibility in a manner that the connection lines always maintain an electrical connection between the heating module and the control module until the aromatherapy substance accommodated in the containment chamber is heated and evaporated.

2. The aromatherapy candle lamp according to claim 1, wherein an outer side of the heating module is wrapped with a protective cover.

3. The aromatherapy candle lamp according to claim 1, wherein the heating module is provided with a temperature sensor, the temperature sensor is electrically connected to the control module, and the temperature sensor is configured to sense a temperature of the heating module.

4. The aromatherapy candle lamp according to claim 1, wherein the housing is provided with a switch hole that is penetrated through, and a control switch is provided inside the switch hole;
  the control switch abuts against a switch of the control module, the control switch is configured to control electrical switching on and off the heating module and to control a heating temperature of the heating module.

5. The aromatherapy candle lamp according to claim 4, wherein the control module is fixed and electrically connected with a plurality of display lamps, and the display lamps are distributed around an axis of the control switch,
  a distance between adjacent two display lamps is the same;
  the display lamps are configured to display a gear of the heating module.

6. The aromatherapy candle lamp according to claim 1, wherein the housing is provided with a charging hole that is penetrated through,
  the control module is fixed and electrically connected to a charging module, the charging module is penetrated and clamped to the charging hole,
  the control module is fixed and electrically connected to a charging display light, and the charging display light is configured to display a charging state of the charging module.

7. The aromatherapy candle lamp according to claim 1, wherein
  the housing is provided with a combustion hole that penetrates through, and a combustion block is provided in the combustion hole to simulate a combustion state of a flame;
  the installation cavity is provided with a flame module, and the flame module is electrically connected to the control module;
  the flame module is fixed and electrically connected to a flame display lamp, and upon the flame display lamp being turned on, the flame display lamp cooperates with the combustion block to achieve a simulation of flame combustion.

8. The aromatherapy candle lamp according to claim 7, wherein a swing spring is provided between the combustion block and the flame module,
  one end of the swing spring is fixedly connected to the combustion block, and the other end of the swing spring is fixedly connected to the flame module;
  based upon external force driving the combustion block, the swing spring drives the combustion block to swing.

* * * * *